US007895901B2

United States Patent
Li et al.

(10) Patent No.: US 7,895,901 B2
(45) Date of Patent: Mar. 1, 2011

(54) PRESSING HEAD STRUCTURE FOR TESTING KEY DURABILITY

(75) Inventors: Lei Li, Shenzhen (CN); Zhi-Qiang Jiang, Shenzhen (CN); Hai-Ri Huang, Shenzhen (CN); Yong Wang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 192 days.

(21) Appl. No.: 12/348,636

(22) Filed: Jan. 5, 2009

(65) Prior Publication Data

US 2009/0290248 A1 Nov. 26, 2009

(30) Foreign Application Priority Data

May 23, 2008 (CN) .......................... 2008 1 0301731

(51) Int. Cl.
*G01N 3/08* (2006.01)
(52) U.S. Cl. .............................. 73/818; 73/760; 73/825

(58) Field of Classification Search ............ 73/760–825
See application file for complete search history.

(56) References Cited

U.S. PATENT DOCUMENTS

| 3,597,981 | A  | * | 8/1971  | Wakabayashi et al. ..... 73/865.9 |
| 6,314,825 | B1 | * | 11/2001 | Fan ........................... 73/865.3 |
| 6,330,514 | B1 | * | 12/2001 | Kuo ............................. 702/35 |
| 6,681,347 | B1 | * | 1/2004  | Chen et al. ..................... 714/44 |
| 7,798,013 | B2 | * | 9/2010  | Chiu et al. ..................... 73/818 |
| 7,800,383 | B2 | * | 9/2010  | Liu et al. ..................... 324/754 |

* cited by examiner

*Primary Examiner*—Max Noori
(74) *Attorney, Agent, or Firm*—D. Austin Bonderer

(57) ABSTRACT

A pressing head structure (100) for testing key durability includes a pressing mechanism (10), a rubber head (40), a connecting mechanism (20) and a balance mechanism (30). The pressing mechanism includes a sliding rod (12) and a first spring (16). The first spring is placed over the sliding rod. The connecting mechanism connects the pressing mechanism and the rubber head. The balance mechanism is rotatably fixed to the connecting mechanism. The balance mechanism engages with the pressing mechanism. When the sliding rod moves down, the first spring and the balance mechanism together supply an unaltered resultant resistance in the moving direction of the sliding rod.

19 Claims, 8 Drawing Sheets

PRESSING HEAD STRUCTURE FOR TESTING KEY DURABILITY

BACKGROUND

1. Technical Field

The present invention relates to pressing heads and, particularly, to a pressing head structure for testing key durability.

2. Description of Related Art

Electronic devices, such as mobile phones, notebooks and personal digital assistants etc., are widely used in our daily life. A Keypad with a plurality of keys is normally used in these electronic devices as an input terminal. The keys of the keypad may easily wear out after repeated usage. Thus, the durability of keys needs to be tested, and normally by means of a testing machine. A testing machine generally includes a pressing head structure for pressing each key. However, conventional pressing head structures cannot provide a constant force on different keys of the keypad, which affect the test result.

Therefore, there is space for improvement within the art.

BRIEF DESCRIPTION OF THE DRAWINGS

Many aspects of pressing head structure for testing key durability can be better understood with reference to the following drawings. The components in the drawings are not necessarily drawn to scale, the emphasis instead being placed upon clearly illustrating the principles of the present pressing head structure, in which.

DETAILED DESCRIPTION OF THE EMBODIMENTS

Figure 1:
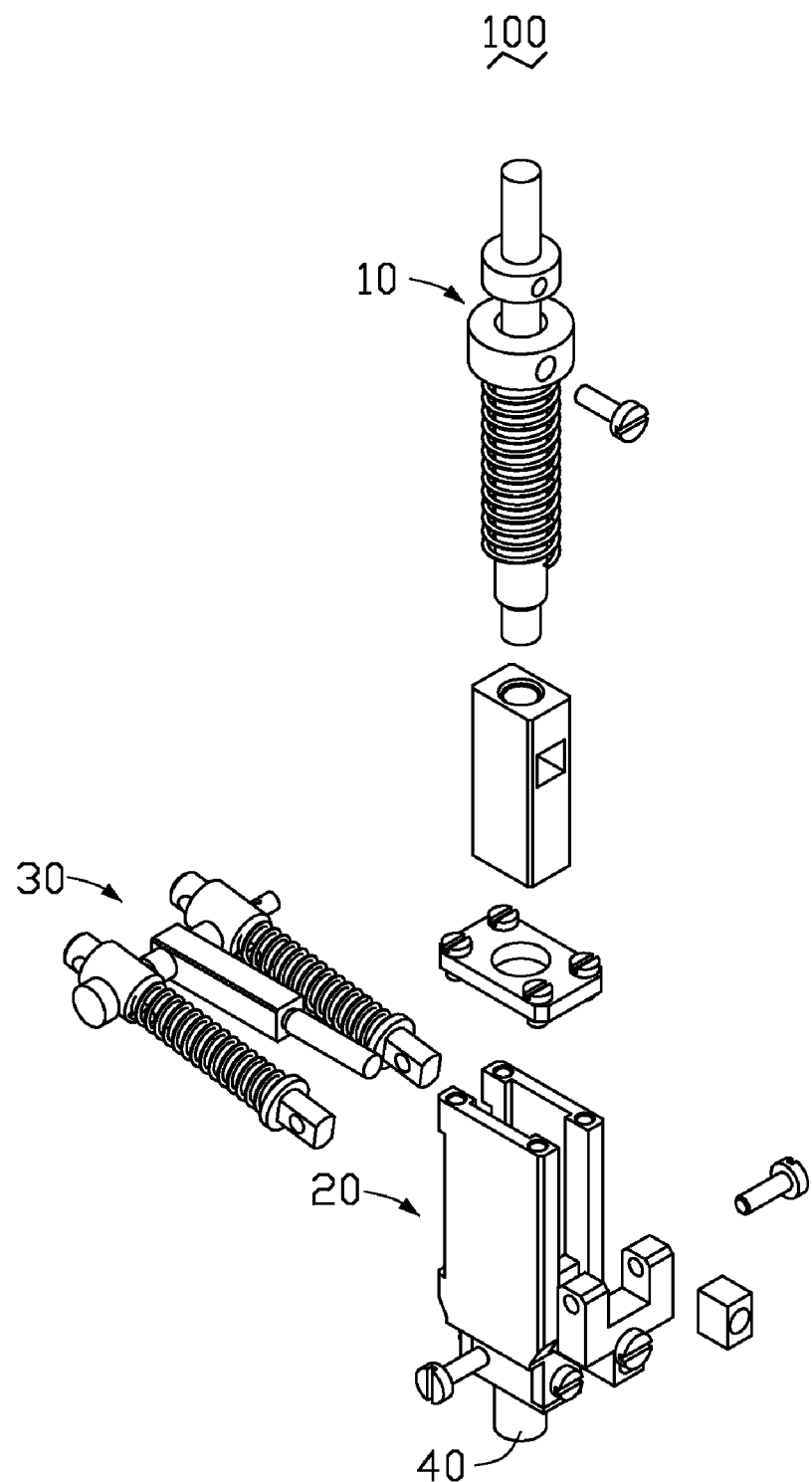
FIG. 1 is an exploded, isometric view of a pressing head structure for testing key durability, in accordance with an exemplary embodiment.

FIG. 1 shows a pressing head structure 100, in accordance with an exemplary embodiment. The pressing head structure 100 is used for testing key durability, including a pressing mechanism 10, a connecting mechanism 20, a balance mechanism 30 and a rubber head 40.

Figure 2:
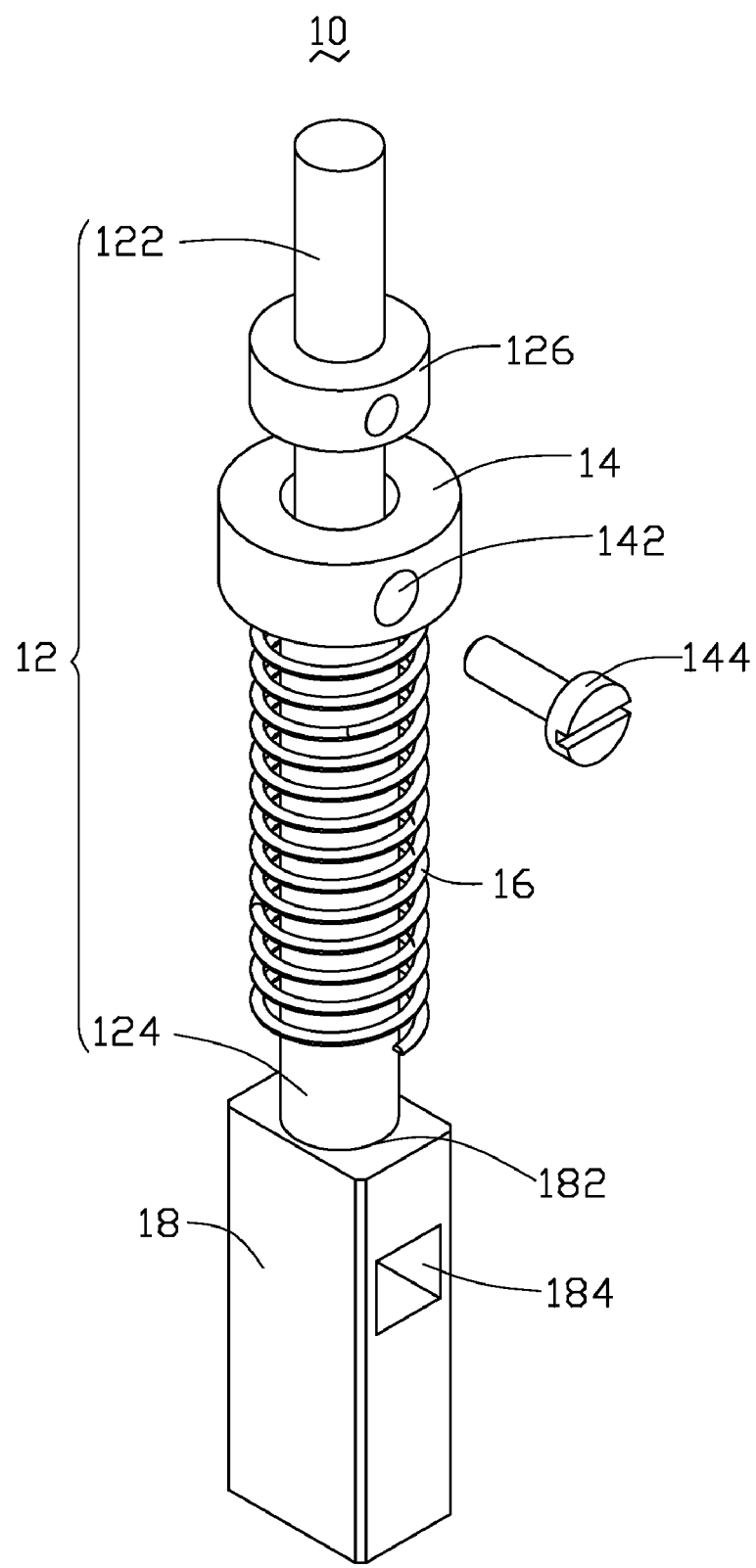
FIG. 2 is an assembled, isometric view of a pressing mechanism shown in FIG. 1.

Referring to FIG. 2, the pressing mechanism 10 includes a sliding rod 12, an adjusting ring 14, a first spring 16 and a sliding block 18. The sliding rod 12 includes a securing portion 122 and a rod portion 124. The securing portion 122 is configured for being fixed to a driving mechanism (not shown). The first spring 16 and the adjusting ring 14 are placed around the rod portion 124. A flange 126 is formed on the securing portion 122 so as to prevent the adjusting ring 14 and the first spring 16 detaching from the sliding rod 12. The adjusting ring 14 defines a screw hole 142 in a radius direction thereof. A bolt 144 is for engaging in the screw hole 142 so that the adjusting ring 14 is firmly fixed on the rod portion 124. The sliding block 18 is substantially a cuboid shaped, and defines a blind hole 182 in an end surface thereof. The sliding rod 12 is firmly attached to the sliding block 18 by interferingly engaging in the blind hole 182. A supporting hole 184 is defined through the sliding block 18. A center line of the supporting hole 184 is perpendicular to an axis of the blind hole 182.

Figure 3:
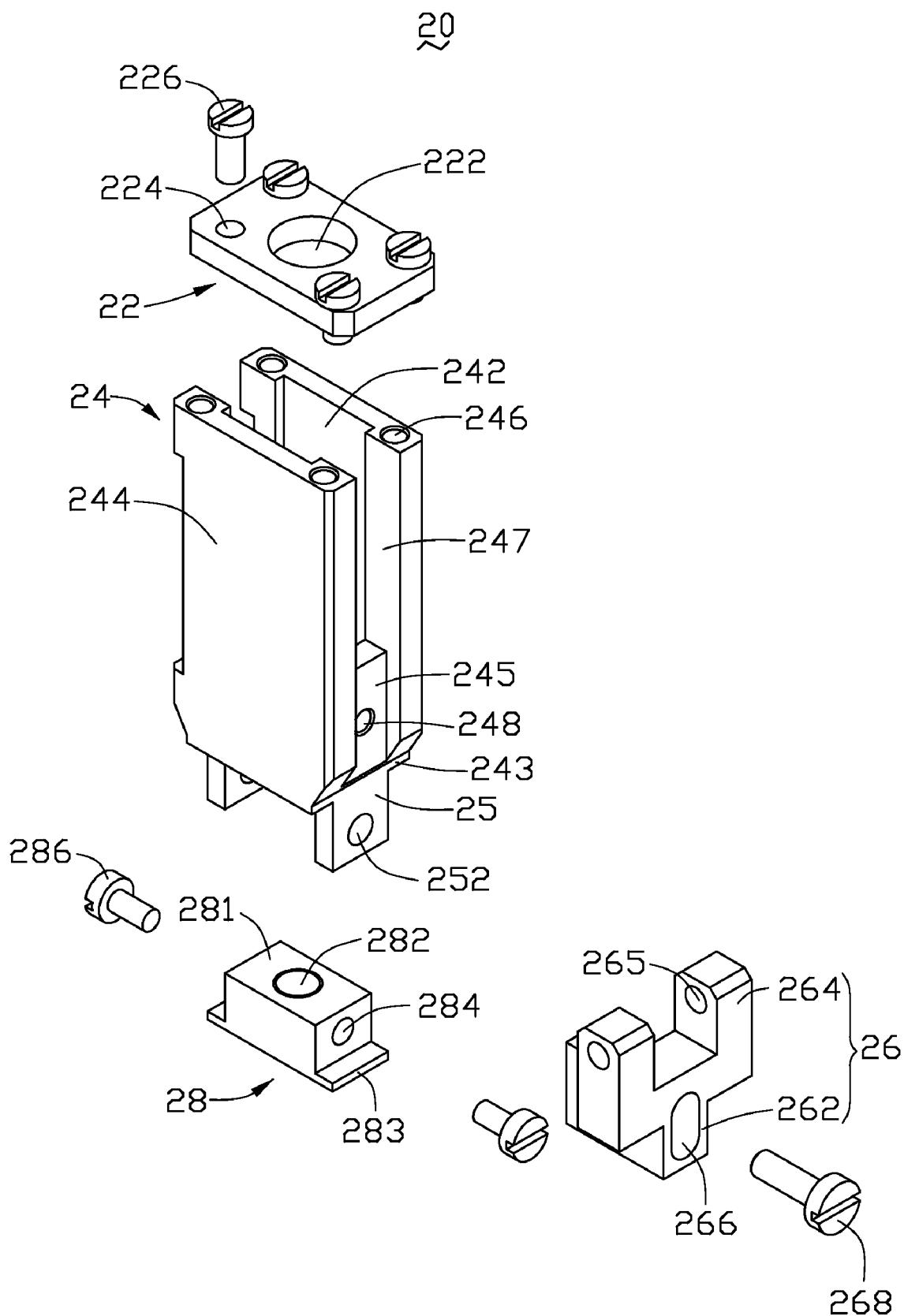
FIG. 3 is an exploded, isometric view of a connecting mechanism shown in FIG. 1.

Referring to FIG. 3, the connecting mechanism 20 includes a cover 22, a frame 24, a supporting base 26 and a holding piece 28. The cover 22 is generally a rectangular flat board, and defines a through hole 222 and four fixing holes 224. The through hole 222 is defined at a central area of the cover 22, allowing the rod portion 124 to pass through. The four fixing holes 224 are defined though the cover 22, and are positioned at four corners of the cover 22.

The frame 24 is generally hollow cuboid, including two opposite first sidewalls 244, two opposite second sidewalls 245, and a bottom wall 243. The first sidewalls 244, the second sidewalls 245 and the bottom wall 243 cooperatively define a receiving room 242 for receiving the sliding block 18. The sliding block 18 can slide in the receiving room 242 along the two first sidewalls 244. Each first sidewall 244 defines two screw holes 246 corresponding to the fixing holes 224 of the cover 22. Four bolts 226 are configured for respectively passing the fixing holes 224 to engage in the screw holes 246, so as to fasten the cover 22 to the frame 24. A height of each second sidewall 245 is lower than that of each first sidewalls 244. Two rectangular slots 247 are defined cooperatively by the second sidewalls 245 and the first sidewalls 244. The slots 247 respectively communicate with the receiving room 242. One of the second sidewalls 245 defines a screw hole 248 for fixing the supporting base 26. Two wings 25 extend from the bottom wall 243 in an opposite extending direction of the second sidewalls 245. Each wing 25 defines a latching hole 252 for fixing the holding piece 28.

The supporting base 26 includes a fixing portion 262 and two arms 264. The fixing portion 262 defines a longitudinal hole 266 corresponding to the screw hole 248 of the second sidewall 245. The two arms 264 are symmetrically and oppositely positioned at two sides of the fixing portion 262. Each arm 264 defines a secured hole 265. An axis of the secured hole 265 is perpendicular to that of the longitudinal hole 266.

The holding piece 28 includes a main body 281 and two extending portions 283 forming at two sides of the main body 281. The main body 281 is configured for being placed between the two wings 25 of the frame 24. The main body 281 defines a central hole 282 and two screw holes 284. An axis of the central hole 282 is perpendicular to that of the screw holes 284. The central hole 282 is configured for receiving the rubber head 40. The positions of the screw holes 284 correspond to those of the latching holes 252 of the wings 25.

Figure 4:
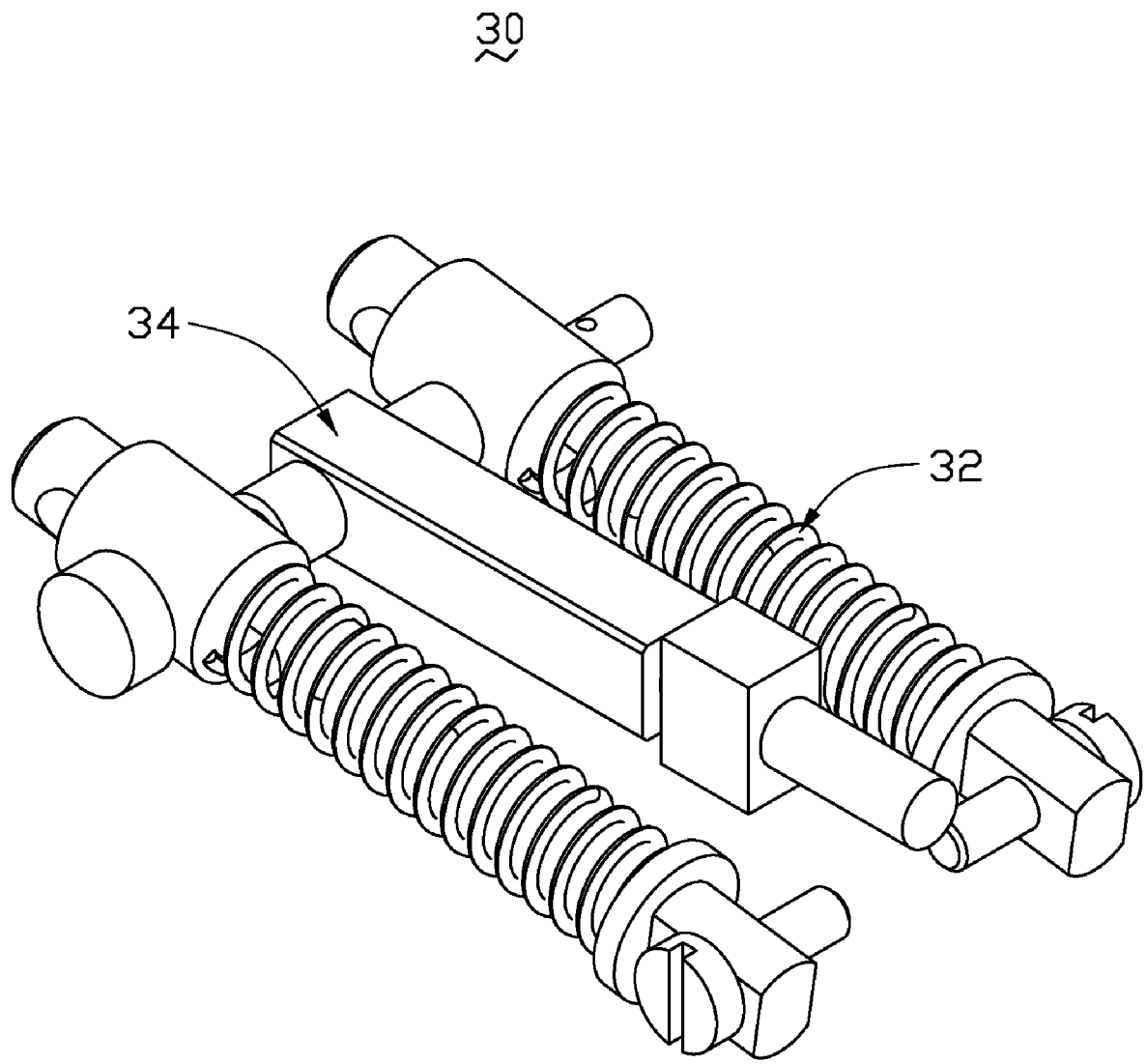
FIG. 4 is an assembled, isometric view of a balance mechanism showed in FIG. 1.

Referring to FIG. 4, the balance mechanism 30 includes two compressing combinations 32 and a connecting combination 34. The connecting combination 34 is configured for connecting the two compressing combinations 32 to the frame 24.

Figure 5:
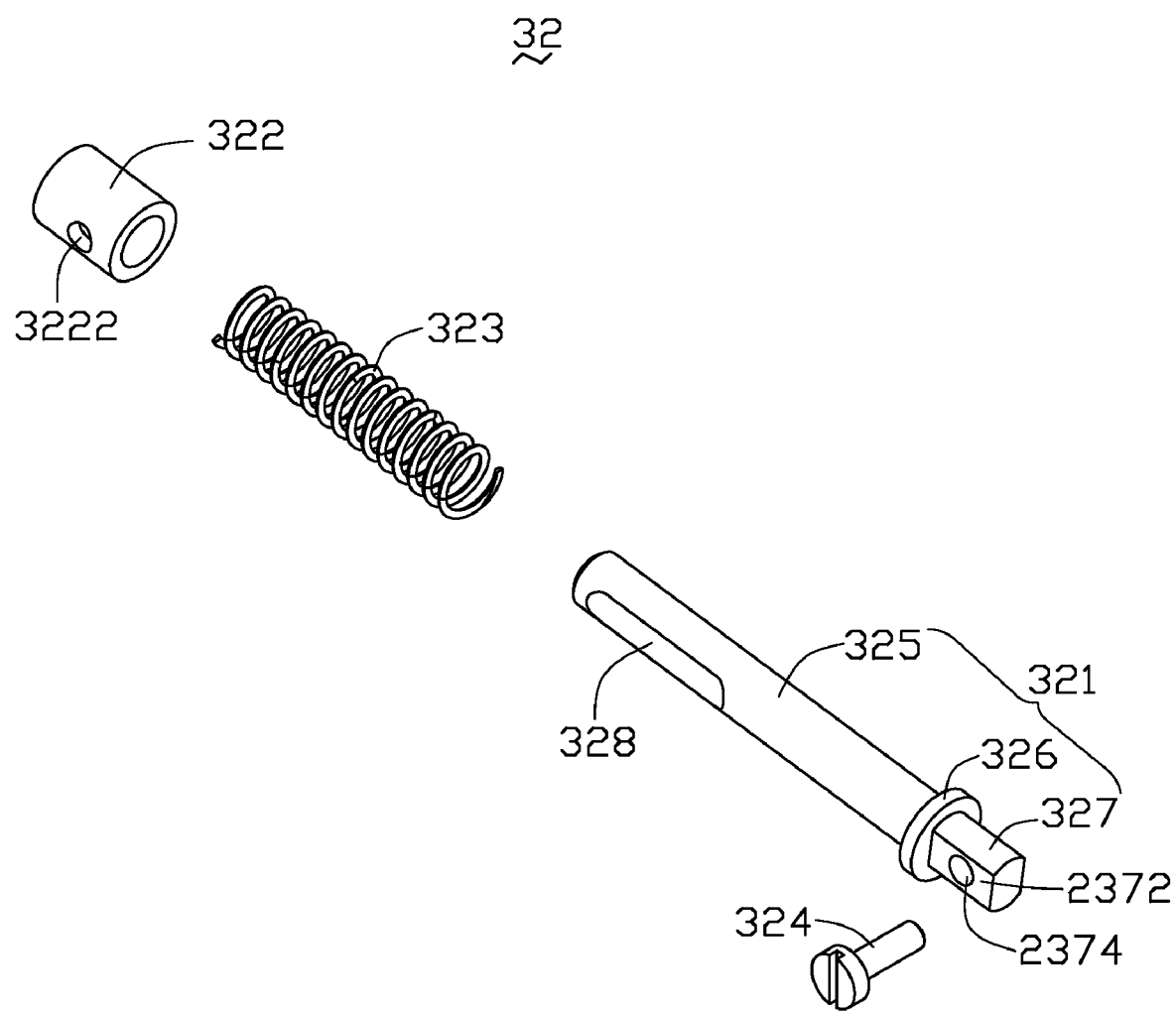
FIG. 5 is an exploded, isometric view of a compressing combination shown in FIG. 4.

Referring to FIG. 5, the compressing combination 32 includes a shaft 321, a sliding sleeve 322, a second spring 323, and a pin 324. The sliding sleeve 322 defines a round hole 3222. An axis of the round hole 3222 is perpendicular to that of the sliding sleeve 322. The shaft 321 includes a shaft portion 325, a flange portion 326 and a connecting portion 327. The sliding sleeve 322 and the second spring 323 are configured to place over the shaft portion 325. The shaft portion 325 defines a sliding slot 328 in a axial direction thereof. The flange portion 326 is position between the shaft portion 325 and the connecting portion 327 and is configured to prevent the sliding sleeve 322 and the second spring 323 from getting away from the shaft 321. The connecting portion 327 has a double-D shape with two flat surfaces 2372, and defines a pin hole 2374 through the two flat surfaces 2372. The pin 324 is configured for being interferingly fixed in the secured holes 265 of the supporting base 26 by passing the pinhole 2374. The shaft 321 can rotate relative to the pin 324 by engagement of the pin 324 and the pin hole 2374.

Figure 6:
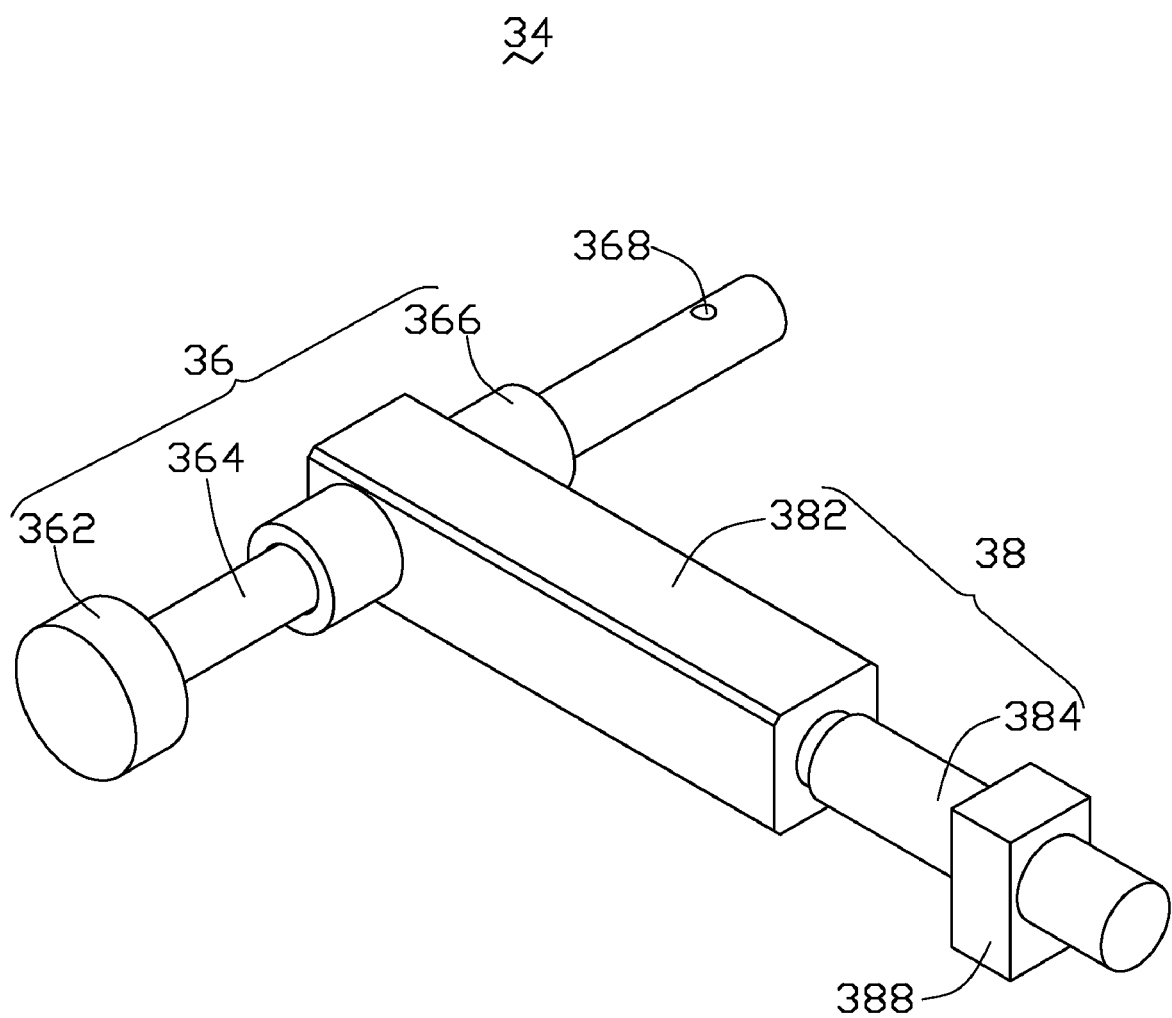
FIG. 6 is an assembled, isometric view of a connecting combination shown in FIG. 4.

Referring to FIG. 6, the connecting combination 34 includes a connecting member 36, two positioning sleeves 366 and a beam 38. The connecting member 36 includes a post 364 and a head 362 at one end of the post 364. The post 364 defines a receiving hole 368 at the other end thereof. The post 364 is configured for jointing the compressing combinations 32, the positioning sleeves 366 and the beam 38 together.

The beam 38 includes an enduring portion 382 and a screw portion 384 extending from one end of the enduring portion 382. The enduring portion 382 defines a through hole (not shown) at the other end thereof, allowing the post 364 to pass. The enduring portion 382 is generally a cuboid body, configured for interferingly engaging in the supporting hole 184 of the sliding block 18. The area of a cross-section of the enduring portion 382 is larger than that of the screw portion 384. A bolt 388 is configured for matching the screw portion 384. The area of a cross-section of the bolt 388 is larger than that of the enduring portion 382, so as to prevent the beam 38 from getting away from the frame 24.

Figure 7:
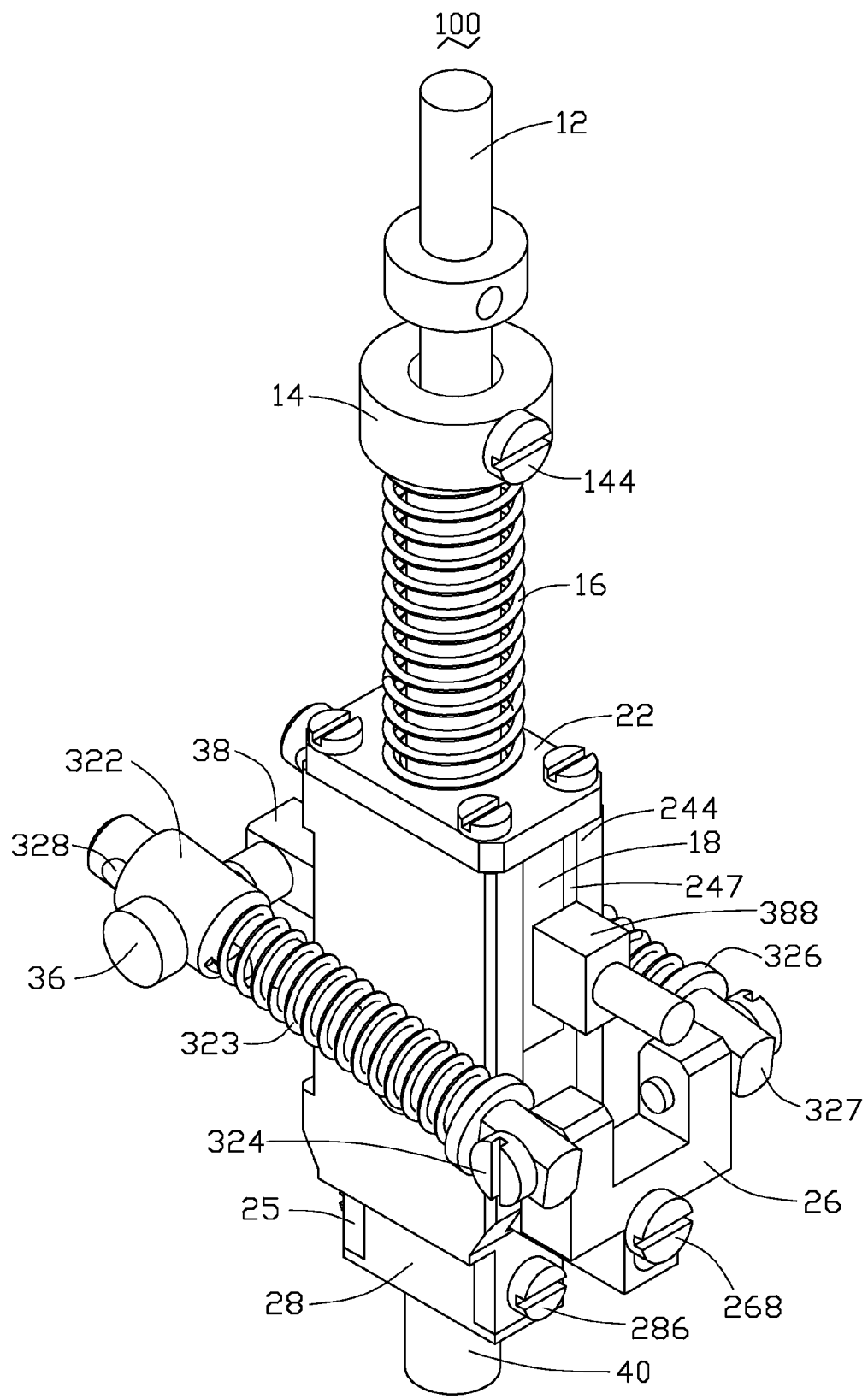
FIG. 7 is an assembled, isometric view of the pressing head structure shown in FIG. 1, showing the pressing head structure in an original state.

In assembly of the pressing head structure 100, referring to FIG. 7, the rubber head 40 is fixed in the central hole 282 of the holding piece 28. The main body 281 of the holding piece 28 is inserted between the two wings 25 of the frame 24, and is fastened to the frame 24 by two bolts 286 respectively passing the latching holes 252 of the wings 25 and engaging in the screw holes 284 of the main body 281. The extending portions 283 of the holding piece 28 resist the two wings 25. Each bolt 286 passes the longitudinal hole 266 of the supporting base 26 and engages in the screw hole 252 of the frame 24, so as to fasten the supporting base 26 to the frame 24. The sliding block 18 is received in the receiving room 242. The cover 22 is fixed to the frame 24 by the four bolts 226 respectively pass the fixing holes 224 of the cover 22 and engage in the screw holes 246 of the frame 24. The rod portion 124, with the first spring 16 and the adjusting ring 14 mounted thereon, connects the sliding block 18 by interferingly engagement of the rod portion 124 and the blind hole 182. The first spring 16 is positioned between the adjusting ring 14 and the cover 22. The bolt 144 is attached to the adjusting ring 14.

Each compressing combination 32 is assembled in such a way that the second spring 323 and the sliding sleeve 322 is placed over the shaft portion 325 of the shaft 321, the second spring 323 is positioned between the sliding sleeve 322 and the flange portion 326. The round hole 3222 of the sliding sleeve 322 corresponds to the sliding slot 328 of the shaft 321, allowing the post 364 of the connecting member 36 to pass. The connecting member 36 connects the two compressing combinations 32, the positioning sleeves 366 and the beam 38, by the post 364 passing the round holes 3222 of the sliding sleeves 322 322, the sliding slots 328 of the beam 38s, the positioning sleeves 366 and the through hole of the beam 38. The two compressing combinations 32 are positioned at two sides of the beam 38. Each positioning sleeve 366 is between one of the compressing combinations 32 and the beam 38. A pin (not shown) or a wiry loop (not shown) is fixed in the receiving hole 368 of the post 364, so as to prevent the compressing combinations 32, the positioning sleeves 366 and the beam 38 from getting away from the connecting member 36. The screw portion 384 of the beam 38 passes the supporting hole 184 of the sliding block 18, and engages with the bolt 388. The enduring portion 382 is partly received in the supporting hole 184 of the sliding block 18. The two compressing combinations 32 are positioned at two sides of the frame 24, and the two pins 324 respectively fasten the shafts 321 to the supporting base 26. The shafts 321 are rotatably relative a corresponding pin 324.

Figure 8:
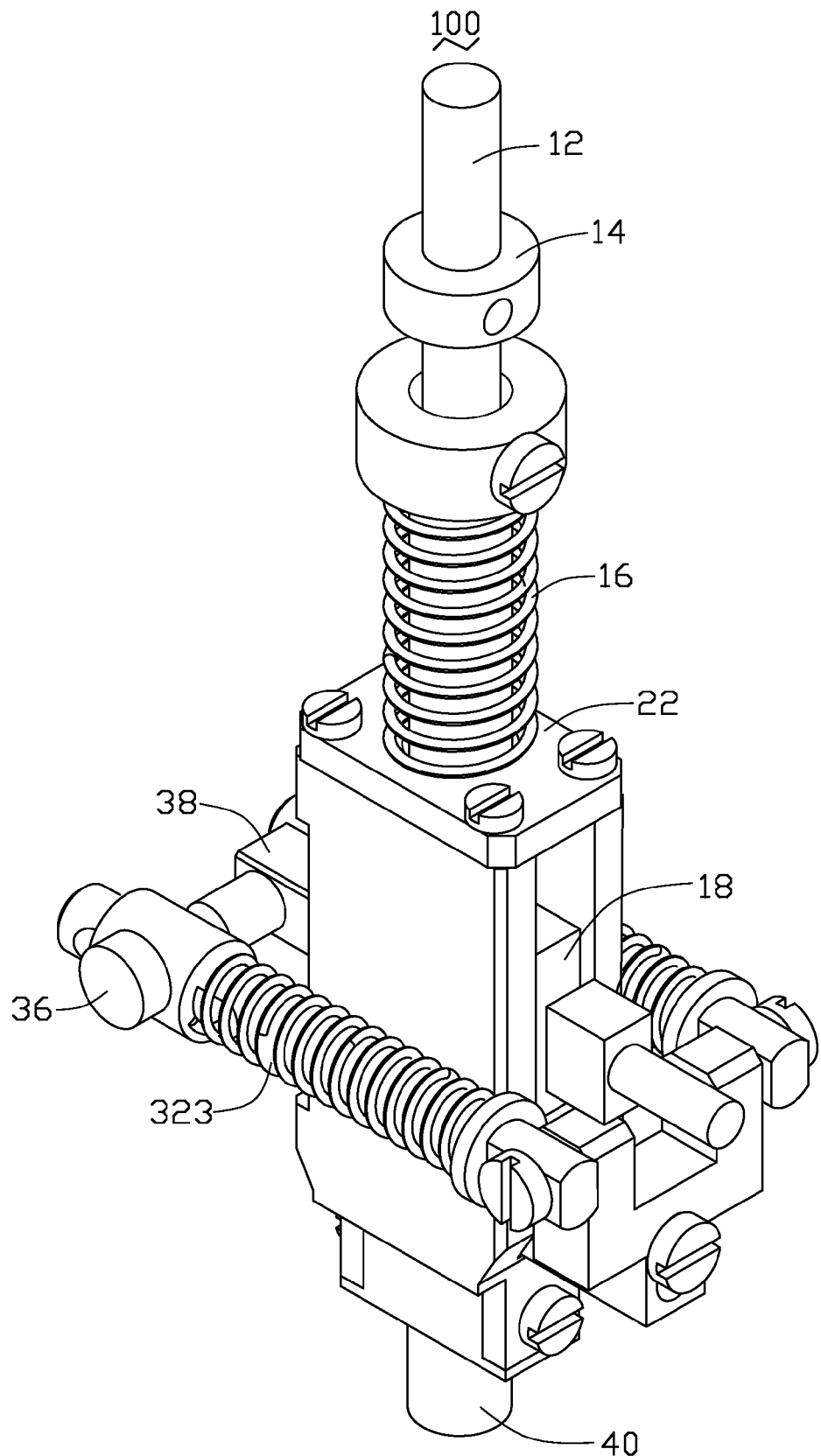
FIG. 8 is similar to FIG. 7, but showing the pressing head structure in another state.

In use, referring to FIG. 8, the rubber head 40 touch one key of a keypad (not shown). The driven mechanism drives the sliding rod 12 to move down. The first spring 16 is compressed. The sliding block 18 and the beam 38 move down with the sliding rod 12. The connecting member 36 is pressed down by the beam 38, and push down the compressing combinations 32. Each shaft 321 rotates relative to the corresponding pin 324. The post 364 of the connecting member 36 with the sliding sleeves 322 slides along the sliding slots 328 of the shaft 321. The second spring 323 is compressed.

Because the first spring 16 is compressed, it produces a first rebounding force F1. K1 is defined to be the elastic coefficient of the first spring 16. S1' is defined to be the original compressed distance of the first spring 16, which is predetermined by positioning the adjusting ring 14 on the sliding rod 12. $\Delta S1$ is defined to be the increased compressed distance of the first spring 16, producing by the movement of the sliding rod 12. Thus, $F1=K1(S1'+\Delta S1)$. When K1 and S1' are constant, F1 increases with $\Delta S1$.

As the second spring 323 is compressed, it produces a rebounding force. This rebounding force can be decomposed into a horizontal component and a vertical component F2. $\alpha$ is defined to be the angle between an axis of the second spring 323 and the horizontal plane. K2 is defined to be the elastic coefficient of the second spring 323. S2' is defined to be the original compressed distance of the second spring 323, which is predetermined by the length of the second spring 323 and the position of the sliding sleeve 322. $\Delta S2$ is defined to be the increased compressed distance of the second spring 323, producing by the rotation of the shaft 321. When the sliding rod 12 moves down, $\alpha$ is reduced, and $\Delta S2$ alter little. Since $F2=K2(S2'+\Delta S2)\sin\alpha$, F2 is reduced as $\alpha$ reduced when K2 and S2' are constant. When $\alpha=0$, $F2=0$.

Defining F being a vertical composition of forces producing by the first spring 16 and the second spring 323, $F=F1+F2=K1(S1'+\Delta S1)+K2(S2'+\Delta S2)\sin\alpha$. As said above, when the sliding rod 12 moves down, F1 is increased, and F2 is reduced. K1–S1'–K2–S2' are respectively given a certain value, satisfying the flowing rule: $K1(S1'+\Delta S1)+K2(S2'+\Delta S2)\sin\alpha$=constant. When the movement of the sliding rod 12 is in a certain range, F is a constant.

It is to be understood that the driven force given on the sliding rod 12 from the driven mechanism is unaltered, and the resistance F is also unaltered when the movement of the sliding rod 12 is in a certain range. Thus, the pressure given on the keys is unaltered.

It is to be understood that the fixing portion 262 of the supporting base 26 may be omitted, and the two arms 264 may directly extend from the two first sidewalls 244 of the frame 24.

It is to be further understood that the two wings 25 of the frame 24 may be omitted, and the holding piece 28 is integrally formed with the frame 24.

It is to be further understood that the two positioning sleeves 366 may be omitted, and the enduring portion 382 has a head defining a through hole. The head resists the two sliding sleeves 322, and the through hole allows the post 364 of the connecting member 36 to pass.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pressing head structure for testing key durability, comprising:
    a pressing mechanism comprising a sliding rod and a first spring, the first spring being placed around the sliding rod;
    a rubber head;
    a connecting mechanism connecting the pressing mechanism and the rubber head; and
    a balance mechanism rotatably attached to the connecting mechanism, the balance mechanism being engaged with the pressing mechanism, when the sliding rod moves down, the balance mechanism rotating relative to the connecting mechanism and cooperating with the first spring to supply an unaltered resultant resistance in the moving direction of the sliding rod.

2. The pressing head structure as claimed in claim 1, wherein the pressing mechanism further comprises a sliding block, the sliding block connects with the sliding rod, the connecting mechanism defines a receiving room, and the sliding block being slidably received in the receiving room.

3. The pressing head structure as claimed in claim 2, wherein the connecting mechanism comprises a cover and a frame, the cover defines a through hole, and is fixed to the frame, the receiving room is defined in the frame, and the sliding rod connects with the sliding block via the through hole.

4. The pressing head structure as claimed in claim 3, wherein the balance mechanism comprises at least one compressing combination and a beam, the beam engages with the sliding block, one end of the compressing combination is rotatably fixed to the frame, and the other end of the compressing combination connects with the beam.

5. The pressing head structure as claimed in claim 4, wherein the number of the at least one compressing combination is two, the two compressing combinations are respectively positioned at two sides of the frame.

6. The pressing head structure as claimed in claim 5, wherein each compressing combination comprises a sliding sleeve, a second spring and a shaft, the sliding sleeve and the second spring are placed around the shaft, and the shaft is rotatably fixed to the frame.

7. The pressing head structure as claimed in claim 6, wherein the balance mechanism further comprises a connecting member, the connecting member connects the two compressing combinations and the beam, and the two compressing combinations are positioned at two sides of the beam.

8. The pressing head structure as claimed in claim 7, wherein the balance mechanism further comprises two positioning sleeves, and each positioning sleeve is placed over the connecting member and is positioned between the beam and one of the compressing combinations.

9. The pressing head structure as claimed in claim 7, wherein the connecting member comprises a post, each sliding sleeve defines a round hole, each shaft defines a sliding slot, the beam defines a through hole, and the post pass the round holes of the sliding sleeves, the sliding slots of the shafts and the through hole of the beam.

10. The pressing head structure as claimed in claim 4, wherein the sliding block defines a rectangular supporting hole, the beam comprises an enduring portion for interferingly engaging in the supporting hole.

11. The pressing head structure as claimed in claim 10, wherein the frame comprises two opposite first sidewalls, two opposite second sidewalls, the first and second sidewalls together form the receiving room.

12. The pressing head structure as claimed in claim 11, wherein the second sidewalls are lower than the first sidewalls, two slots are formed cooperatively by the first and second sidewalls, the slots communicate to the receiving room, and the beam passes the slots.

13. The pressing head structure as claimed in claim 1, wherein the pressing mechanism further comprises an adjusting ring, the adjusting ring is placed around the sliding rod and resists the first spring.

14. The pressing head structure as claimed in claim 3, wherein the connecting mechanism further comprises a holding piece attached to the frame, and the holding piece defines a central hole to receive the rubber head.

15. The pressing head structure as claimed in claim 11, wherein the connecting mechanism further comprises a supporting base fixed to the frame, the supporting base comprises two arms, each arm defines a secured hole, the compressing combination further comprises a shaft, the shaft defines a pin hole, and the shaft is fastened to the supporting base by the shaft engaging with the pin hole and the secured hole via a pin.

16. A pressing head structure for testing key durability, comprising:
    a pressing mechanism comprising a sliding rod and a first spring, the first spring being placed around the sliding rod;
    a rubber head;
    a connecting mechanism connecting the pressing mechanism and the rubber head; and
    a balance mechanism rotatably attached to the connecting mechanism and engaged with the pressing mechanism, the balance mechanism including a second spring, when the sliding rod moves down, the first spring and the second spring cooperatively supplying an unaltered resultant resistance in the moving direction of the sliding rod.

17. The pressing head structure as claimed in claim 16, wherein the balance mechanism further comprises a compressing combination and a beam, the beam is moved with the rod, the spring is one part of the compressing combination, one end of the compressing combination is rotatably attached to the connecting mechanism, the other end is connected to the beam, and the second spring is compressed or extends when the compressing combination rotates relative to the connecting mechanism.

18. The pressing head structure as claimed in claim 17, wherein the compressing combination further comprises a sleeve and a shaft, the second spring and the sleeve are mounted on the shaft, the sleeve abuts the second spring, and the sleeve slides forward or backward along the shaft during rotation of the compressing combination.

19. A pressing head structure for testing key durability, comprising:
    a pressing mechanism comprising a sliding rod and a first spring, the first spring being placed around the sliding rod;
    a rubber head;

a connecting mechanism connecting the pressing mechanism and the rubber head; and a beam connected to and moved with the rod;

a compressing combination including a second spring, one end of the compressing combination rotatably attached to the connecting mechanism, and another end connected to the beam, when the sliding rod moves down, the beam bringing the compressing combination to rotate relative to the connecting mechanism, the first and the second spring cooperatively supplying an unaltered resultant resistance in the moving direction of the sliding rod.

* * * * *